United States Patent [19]
Ziaylek, Jr.

[11] 3,834,438
[45] Sept. 10, 1974

[54] ULTRASONIC INSERTS
[75] Inventor: Theodore Ziaylek, Jr., Yardley, Pa.
[73] Assignee: Yardley Products, Yardley, Pa.
[22] Filed: Jan. 17, 1973
[21] Appl. No.: 324,339

[52] U.S. Cl. ............................ 151/41.73, 85/21
[51] Int. Cl. ................................... F16b 39/282
[58] Field of Search .......... 151/41.73; 85/21, 20, 44

[56] References Cited
UNITED STATES PATENTS
3,163,197 12/1964 Rosan et al. .................. 151/41.73
3,530,921 9/1970 Ernest .......................... 151/41.73
3,719,342 3/1973 Kupersmit ........................ 85/21

FOREIGN PATENTS OR APPLICATIONS
268,521 4/1927 Great Britain ..................... 85/21

Primary Examiner—Edward C. Allen
Attorney, Agent, or Firm—Sperry and Zoda

[57] ABSTRACT

A metal insert adapted to be at least partially embedded in thermoplastic material is provided with a cylindrical body having spaced annular ribs on the outer surface thereof. The ribs have surfaces facing toward the inner end of the insert which are inclined at about 135° with respect to the adjacent surface of the cylindrical body and have opposite radially extending surfaces facing toward the outer end of the insert. The outer extemities of the ribs are rounded so as to eliminate sharp edges or corners contacting the thermoplastic material thereby facilitating movement of the insert into the material and at the same time reducing the stress and mechanical working of the material under heat and pressure during displacement and flow thereof about and into retaining engagement with the ribs as the insert is embedded in the thermoplastic material.

1 Claim, 4 Drawing Figures

PATENTED SEP 10 1974 3,834,438

ULTRASONIC INSERTS

FIELD OF THE INVENTION

Metal inserts are frequently embedded in thermoplastic material to receive fasteners or permit the attachment of other members to a thermoplastic base or article. For this purpose it is common practice to drill or otherwise form a hole in the plastic. A metal insert is then forced into the plastic under pressure and with the aid of heat or ultrasonic means to at least partially embed the insert in the thermoplastic material.

A typical insert is provided with a generally cylindrical body having radially extending ribs or threads thereon about which the thermoplastic material may flow or into which the threads may cut to secure the insert in place. However, there is a tendency for the thermoplastic material to break down or deteriorate under the severe mechanical and thermal stress and working to which it is subjected as it is forced over or about the edges of such ribs during the operation of forcing the insert into the material. Moreover any deterioration or weakness in the assembly thus developed occurs at the very points where the greatest forces will be applied upon vibration or other movement of the insert with respect to the material in which it is embedded.

In accordance with the present invention metal inserts are provided with a generally cylindrical body with retaining ribs thereon which are so formed as to facilitate insertion and retention of the insert while materially reducing the stress or mechanical working of the thermoplastic material contacted thereby during and after insertion of the member into a body of thermoplastic material.

These advantages are attained by forming the insert with a generally cylindrical body having annular ribs spaced apart longitudinally of the body and projecting radially outward from the body. In the applicant's construction these ribs are formed with one face thereof inclined toward the inner end of the insert at an obtuse angle to the cylindrical body and the opposite face of each rib extends radially outward from the body and is directed toward the outer end of the member. However, the radial extremities of the ribs are rounded to prevent any sharp or angular corners or edges from coming into contact with the thermoplastic material during movement of the member into the material upon insertion thereof. The ribs are preferably also provided with concave depressions or channels therein through which material displaced by the ribs upon insertion of the member may flow axially so as to spread laterally into retaining engagement with the radially extending outwardly facing surfaces of the ribs.

THE DRAWING

PREFERRED EMBODIMENTS

Figure 1:
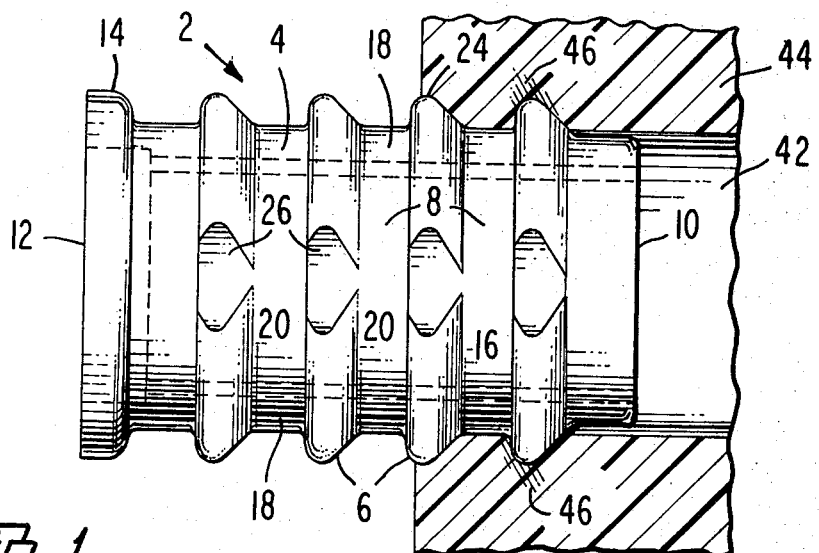
FIG. 1 is a side elevation of a typical form of insert embodying the present invention.
Figure 2:
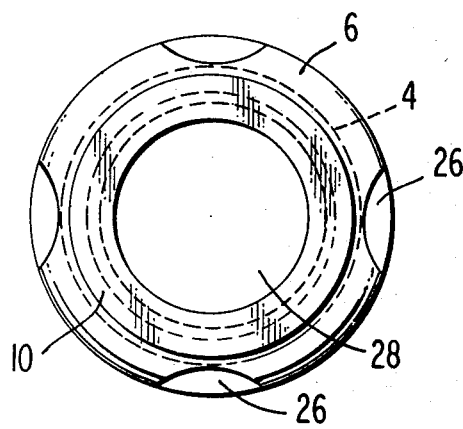
FIG. 2 is an end view of the insert shown in FIG. 1 as seen from the inner end thereof.
Figure 3:
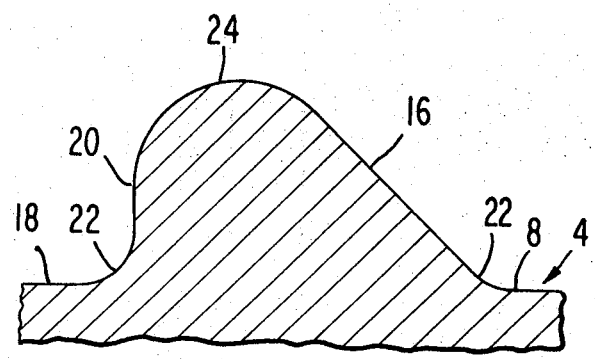
FIG. 3 is an enlarged view in longitudinal cross section through one of the radially extending ribs of the insert of FIG. 1.

In that form of the invention chosen for purposes of illustration in FIGS. 1, 2, and 3, the insert 2 is formed of a metal such as brass, aluminum, steel or the like and provided with a body 4 which is generally cylindrical in shape. The body has a plurality of annular, radially extending ribs 6 projecting outwardly from the cylindrical body and spaced apart longitudinally of the body so as to provide annular grooves 8 therebetween. The inner end 10 of the insert projects beyond the adjacent rib 6 on the cylindrical body whereas the outer end 12 of the body may be formed with a terminal flange 14.

The ribs 6, as shown in cross section in FIG. 3, are each formed with a face 16 inclined at an obtuse angle with respect to the adjacent cylindrical surface of the body and sloping toward the inner end 10 of the insert. The face 16 of each rib is preferably inclined at an angle of about 135° with respect to the surface 18 which forms the base of the groove 8 between adjacent ribs. The opposite face 20 of each rib extends radially outward from the cylindrical body of the insert so as to be disposed at an angle of about 90° with respect to the surface 18 forming the base of the groove 8 between adjacent ribs. The inner extremities of the opposite faces 16 and 20 of each rib adjacent the cylindrical surface 18 at the base of each groove may be rounded to present outwardly facing curved surfaces or fillets 22 which allow the thermoplastic material to flow into continuous extended contact with the surfaces of the ribs. In this way it is possible to eliminate voids or discontinuities which tend to reduce the strength of the bond between the insert and plastic material.

The outer extremities 24 of the ribs 6 are rounded in an axial direction as shown in FIG. 3 with the radius of curvature of the surface 24 preferably being about one fourth to one half the radial height of the rib and sufficient to present a smooth rounded contour affording a relatively gradual transition from the obtuse surface 16 of the rib to the opposite radially extending surface 20 thereof.

The ribs 6 preferably also are provided with a plurality of circumferentially spaced concave recesses or channels 26 extending axially through the ribs from one groove 8 to the next as shown in FIGS. 1 and 2. These channels are preferably of a depth substantially equal to the radial height of the ribs so as to extend inward from the outer extremities of the ribs to a point adjacent the cylindrical base 18 of the grooves 8 between the ribs. Further, as shown in FIG. 1 the recesses 26 in the ribs may be aligned axially of the insert The form of insert shown in FIGS. 1 and 2 is of a generally tubular shape having a central bore 28 provided with internal threads 30 for receiving a bolt or other element provided with a shank which has corresponding external threads. If desired the inner end of the bore 28 may terminate short of the inner end 10 of the insert so as to present a closed inner end precluding flow of thermoplastic material into the bore 28 upon forcing the insert into a body of plastic material.

Figure 4:
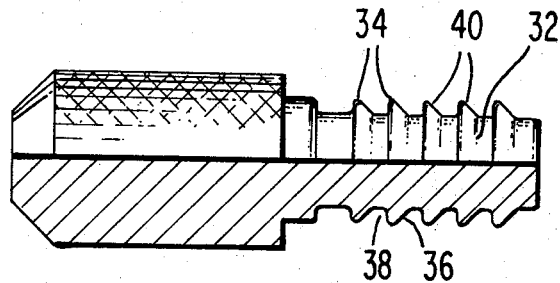
FIG. 4 is a side elevation of an alternate form of insert embodying the present invention.

In the alternative form of invention illustrated in FIG. 4 the cylindrical body 30 of the insert is provided at its outer end with an enlarged knurled head 32 for attachment of another member to the insert. However, the body 30 of the insert is formed with longitudinally spaced, annularly projecting ribs 34 having inclined faces 36 and radially extending faces 38 merging into a rounded outer extremity 40 as shown in FIG. 3 and described above.

When using the inserts of the present invention, it is most usual, as shown in FIG. 1, to form a hole 42 in a body of thermoplastic material 44 into which the insert is to be embedded. The hole 42 is generally of approximately the same diameter as the cylindrical body 4 of the insert and smaller in diameter than the ribs 6 of the insert. The insert is applied to a thermal or ultrasonic tool and forced into the hole 42 until it has been embedded to the desired depth in the body of material 44.

During movement of the insert into the hole 42 the material surrounding the hole and engaged by the ribs 6 is fused or softened sufficiently to permit it to be displaced by the ribs so as to flow into the grooves 8 between the ribs to secure the insert firmly in place upon resolidification of the thermoplastic material. The flow of material takes place with gradual movement outward over the inclined surfaces 16 of the ribs 6 and through the concave recesses or passages 26 in the ribs into the grooves 8 between the ribs. That portion of the thermoplastic material flowing over the rounded outer extremities 24 of the ribs 6 is displaced relatively gradually and without excessive stress or contact with any sharp or abrupt surfaces against which it might otherwise pack or be subjected to excessive pressure and mechanical working while at an elevated temperature. At the same time the pressure applied to the heated and softened thermoplastic material is relieved by flow thereof through the widest portion of the concave recesses or passages 26 in the ribs near the smooth rounded periphery of the ribs. As a result the plastic flows readily and under more nearly uniform pressure into the grooves 8 between the ribs and into contact with the radially extending rear faces 20 of the ribs. The distribution and flow of the softened thermoplastic material is therefore such as to assure practically complete filling of the grooves 8 with thermoplastic material and extended contact thereof with the radial surfaces 20 of the ribs 6. Moreover, the danger of degradation or damage to the thermoplastic material in the area indicated at 46 in FIG. 1 adjacent the extremities of the ribs 6 is minimized. Furthermore, the inclined surfaces 16 of the ribs permit the insert to be forced into the hole 42 with less pressure and more quickly and easily than would otherwise be possible. The reduced time and pressure required to embed the insert in the plastic also reduces the danger of deterioration of the thermoplastic material.

Upon solidification of the material after removal of the inserting tool, the insert is positively and firmly secured in place. In this way the strength of the material in the area 46 adjacent the extremities 24 of the ribs is unimpared. Thereafter upon subsequent vibration tilting or other stress applied to the fixed insert tending to displace the same the forces which might thereby be exerted most forcefully or concentrated in the area 46 at the extremities of the ribs 6 will be resisted by material having unimpared strength and durability characteristics of the thermoplastic material in which the insert is embedded.

The hardened plastic material within the grooves 8 and in contact with the radially extending faces 20 of the ribs which face toward the outer end of the insert, effectively prevents withdrawal of the insert from the body 44. At the same time, the hardened material within the circumferentially spaced recesses or passages 26 in the ribs serves to prevent rotation of the insert within the plastic body upon threading of an element into or out of the bore 28 within the insert. Furthermore, the axial alignment of the passages 26 results in a minimum of fusion of the plastic material along lines parallel to the axis of the insert so that the strength of the plastic disposed in these recesses is unimpared.

The present invention may be embodied in various types of metal inserts in addition to those shown in the figures of the drawing. Furthermore the angle of inclination of the faces of the ribs with respect to the cylindrical body of the insert may be somewhat more or less than 135° if desired and the radius of curvature of the peripheral surface of the ribs may be varied considerably. It should therefore be understood that the particular embodiment of the invention shown in the drawing and described above are intended to be illustrative only and are not intended to limit the scope of the following claims.

I claim:

1. A metal member adapted to be inserted into thermoplastic material comprising a cylindrical body having an inner end and an outer end with a plurality of annular radially extending ribs arranged in longitudinally spaced relation on the surface of said body, each of said ribs presenting a face inclined toward the inner end of said body at an angle of about 135° with respect to the adjacent surface of the cylindrical body and presenting an opposite face directed toward the outer end of the body at an angle of about 90° with respect to the cylindrical surface of the body, the peripheral extremities of said ribs being rounded to present an arcuate surface having a radius of curvature equal to from about one fourth to one half the radial height of the ribs and joining the opposite faces of the ribs, the opposite faces of the ribs each being formed with a fillet presenting a smooth arcuate surface facing outwardly adjacent the cylindrical surface of the body of said member, said ribs having longitudinally aligned recesses therein defining axially extending channels on the outer surface of said cylindrical body, a flange at the outer end of said body which is circular in form and at least as large in diameter as the ribs so as to close the ends of said channels, and means on said metal member for securing another element thereto.

* * * * *

UNITED STATES PATENT AND TRADEMARK OFFICE
CERTIFICATE OF CORRECTION

PATENT NO. : 3,834,438
DATED : September 10, 1974
INVENTOR(S) : Theodore Ziaylek, Jr.

It is certified that error appears in the above-identified patent and that said Letters Patent are hereby corrected as shown below:

Claim 1, line 5, (Column 4, line 35) before "surface" insert -- outer --.

Signed and Sealed this first Day of June 1976

[SEAL]

Attest:

RUTH C. MASON
*Attesting Officer*

C. MARSHALL DANN
*Commissioner of Patents and Trademarks*